US010649239B2

(12) United States Patent
Kniess et al.

(10) Patent No.: US 10,649,239 B2
(45) Date of Patent: May 12, 2020

(54) EYEGLASSES WITH EMBEDDED FEMTOPROJECTORS

(71) Applicant: Spy Eye, LLC, Los Gatos, CA (US)

(72) Inventors: Herbert John Kniess, San Jose, CA (US); Brian Elliot Lemoff, Morgan Hill, CA (US)

(73) Assignee: Tectus Corporation, Saratoga, CA (US)

( * ) Notice: Subject to any disclaimer, the term of this patent is extended or adjusted under 35 U.S.C. 154(b) by 198 days.

(21) Appl. No.: 15/993,028

(22) Filed: May 30, 2018

(65) Prior Publication Data

US 2019/0369417 A1    Dec. 5, 2019

(51) Int. Cl.
| G02C 1/00 | (2006.01) |
| G02C 11/00 | (2006.01) |
| G03B 21/20 | (2006.01) |
| G03B 21/28 | (2006.01) |

(52) U.S. Cl.
CPC .......... *G02C 11/10* (2013.01); *G03B 21/2013* (2013.01); *G03B 21/2033* (2013.01); *G03B 21/28* (2013.01)

(58) Field of Classification Search
CPC .......... G02B 2027/0178; G02B 27/017; G02B 27/01; G02C 11/10; G02C 7/04
USPC ................. 351/158, 41; 348/143; 345/633, 8
See application file for complete search history.

(56) References Cited

U.S. PATENT DOCUMENTS

| 4,268,842 A | 5/1981 | Jacob et al. |
| 4,408,217 A | 10/1983 | Kobayashi et al. |
| 4,608,581 A | 8/1986 | Bagratishvili et al. |
| 4,711,512 A | 12/1987 | Upatnieks |
| 5,638,218 A | 6/1997 | Oomura |
| 5,638,219 A | 6/1997 | Medina Puerta et al. |
| 6,023,076 A | 2/2000 | Shibata |
| 6,410,940 B1 | 6/2002 | Jiang et al. |
| 6,560,039 B1 | 5/2003 | Webb et al. |
| 7,592,637 B2 | 9/2009 | Zimmerman et al. |
| 8,058,663 B2 | 11/2011 | Fan et al. |
| 8,134,778 B2 | 3/2012 | Guyer |

(Continued)

FOREIGN PATENT DOCUMENTS

| GB | 1216075 A | 12/1970 |
| WO | WO 2009/143802 A1 | 12/2009 |
| WO | WO 2016/079505 A1 | 5/2016 |

OTHER PUBLICATIONS

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL: https://web.archive.org/web/20160803183105/http://www.telescope-optics.net/two-mirror.htm>.

(Continued)

*Primary Examiner* — Hung X Dang
(74) *Attorney, Agent, or Firm* — Fenwick & West LLP

(57) ABSTRACT

A pair of electronic eyeglasses includes an eyeglasses frame and an eyeglasses lens mounted within the eyeglasses frame. At least one femtoprojector is embedded within the eyeglasses lens. The femtoprojector includes an image source and an optical system that projects an image from the image source onto the retina of the wearer. The femtoprojector is small enough that is does not significantly interfere with the wearer's view through the eyeglasses lens.

20 Claims, 8 Drawing Sheets

(56) References Cited

U.S. PATENT DOCUMENTS

| | | |
|---|---|---|
| 8,552,436 B2 | 10/2013 | Bibi et al. |
| 8,571,789 B2 | 10/2013 | Monde et al. |
| 8,786,675 B2 | 7/2014 | Deering |
| 9,041,025 B2 | 5/2015 | Lau et al. |
| 9,047,818 B1 | 6/2015 | Day et al. |
| 9,063,352 B2 | 6/2015 | Ford et al. |
| 9,111,473 B1 | 8/2015 | Ho et al. |
| 9,134,534 B2 | 9/2015 | Border et al. |
| 9,251,745 B2 | 2/2016 | Sprague |
| 2002/0140906 A1 | 10/2002 | Gibbon et al. |
| 2005/0180687 A1 | 8/2005 | Amitai |
| 2006/0055309 A1 | 3/2006 | Ono et al. |
| 2009/0189830 A1 | 7/2009 | Deering et al. |
| 2010/0060553 A1 | 3/2010 | Zimmerman et al. |
| 2011/0176205 A1 | 7/2011 | Shaw et al. |
| 2012/0154876 A1 | 6/2012 | Shimoda |
| 2012/0223875 A1 | 9/2012 | Lau et al. |
| 2013/0126827 A1 | 5/2013 | Bibl et al. |
| 2013/0278631 A1 | 10/2013 | Border et al. |
| 2014/0070263 A1 | 3/2014 | Choi et al. |
| 2014/0098226 A1 | 4/2014 | Pletcher et al. |
| 2014/0118829 A1 | 5/2014 | Ma et al. |
| 2015/0301338 A1 | 10/2015 | Van Heugten |
| 2015/0312560 A1 | 10/2015 | Deering et al. |
| 2019/0179222 A1* | 6/2019 | Choy ............. H01L 33/44 |

OTHER PUBLICATIONS

Avago Technologies, "ADNE-2620 Optical Mouse Sensor Data Sheet," Mar. 27, 2008, 27 pages.

Choi, H.W. et al., "High-Resolution 128 × 96 Nitride Microdisplay," IEEE Electron Device Letters, May 2004, vol. 25, No. 5., pp. 277-279.

Day, J. et al., "III-Nitride Full-Scale High-Resolution Microdisplays," Applied Physics Letters, 2011, vol. 99, No. 031116, 2 pages.

Henry, W., "MicroLED Arrays Find Applications in the Very Small," Photonics Media, Mar. 2013, 7 pages.

Hernsdorf, J. et al., "Active-Matrix GaN Micro Light-Emitting Diode Display with Unprecedented Brightness," IEEE Transactions on Electron Devices, Jun. 2015, vol. 62, No. 6, pp. 1918-1925.

Kang, C-M. et al., "Fabrication of a Vertically-Stacked Passive-Matrix Micro-LED Array Structure for a Dual Color Display," Optics Express, Feb. 6, 2017, vol. 25, No. 3, 7 pages.

PCT International Search Report and Written Opinion, PCT Application No. PCT/US17/572.40, dated Jan. 12, 2018, 23 pages.

Peifu, G., "Design and Preparation of Quarter-Wave Plate Coatings," National Air Intelligence Center, May 12, 1995, 16 pages.

Song et al "Baffles design for the axial two-mirror telescope.", Optical Engineering, 2002, vol. 41, No. 9, pp. 2353-2357.

Tremblay, EJ, et al., "Ultrathin Cameras Using Annular Folded Optics," Applied Optics, Feb. 2007, vol. 46, No. 4. pp. 463-471.

"Expand Your World by "Seeing the Unseeable" Retinal Imaging Laser Eyewear: the Smart Eyewear that Projects Images onto the Retina (Part 1)," *Fujitsu Journal*, Dec. 13, 2016, Retrieved from the internet <URL:http://journal.jp.fujitsu.com/en/2016/12/13/01/>.

Bohn, D., "Intel Made Smart Glasses That Look Normal," The Verge, Feb. 5, 2018, [Online] [Retrieved Jul. 19, 2018], Retrieved from the internet <URL:https://www.theverge.com/2018/2/5/16966530/intel-vaunt-smart-glasses-announced-ar-video>.

Holton, C., "New smart glasses from QD Laser rely on laser retinal imaging," LaserFocusWorld.com, Jun. 5, 2014, Retrieved from the internet <URL:https://www.laserfocusworld.com/articles/2014/05/new-smart-glasses-from-qd-laser-rely-on-laser-retinal-imaging.html>.

* cited by examiner

EYEGLASSES WITH EMBEDDED FEMTOPROJECTORS

BACKGROUND

1. Technical Field

This disclosure relates generally to eyewear, for example eyeglasses containing embedded image projectors.

2. Description of Related Art

Glasses are a common sight in today's society, and are worn by a large fraction of the world's population, for vision correction as well as for style. With recent innovations in miniaturization and virtual reality/augmented reality (VR/AR) technology, glasses can also be used as a platform for mounting electronic devices capable of performing various functions for the wearer. For example, in products such as Google Glass, a projector is mounted on the frame of a pair of glasses. Images from the projector are directed by a small prism (also mounted on the frame) into the wearer's eye, thus displaying images to the wearer of the glasses. The projector plus prism can function as a head-up display, allowing the wearer to view the surrounding area as well as the projected images simultaneously. This allows the wearer to view relevant information displayed by the projector while maintaining awareness of the world around him.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

As used herein, "electronic eyeglasses" refers to a pair of eyeglasses containing at least one electronic device that is embedded within the eyeglasses, usually within the eyeglasses lenses. The pair of electronic eyeglasses includes a frame and at least one lens mounted within the frame. Typically, it will contain two lenses. The wearer views the external environment through the eyeglasses lenses. In some embodiments, the electronic eyeglasses include one or more femtoprojectors embedded within the lens(es). A femtoprojector is a projector small enough in size (typically, less than 2 mm×2 mm×2 mm) that when embedded within the lens of a pair of eyeglasses, it does not significantly affect the wearer's view through the eyeglasses lens. It contains an image source and an optical system that projects an image from the image source through a pupil of the wearer's eye and onto the wearer's retina when the wearer is looking in the direction of the femtoprojector, thus superimposing virtual objects onto the field of view of the wearer.

In addition, the femtoprojector may be positioned off-center in the eyeglasses lens, so that the image from the femtoprojector is not viewable by the wearer if the wearer is gazing straight ahead. Rather, the viewer must direct his gaze away from the optical center of the eyeglasses lens and towards the femtoprojector in order to view the image from the femtoprojector.

In some applications, the electronic eyeglasses may include multiple femtoprojectors. The electronic eyeglasses may further include additional electronic components, such as a power coil, battery, or other component for providing power to the femtoprojector(s), and a controller that generates or receives image data to be displayed by the femtoprojector. In some embodiments, the additional electronic components (including additional femtoprojectors) may be embedded within the frame of the electronic eyeglasses.

The use of femtoprojectors embedded within the eyeglasses lens(es) allows the wearer to view content such as images, videos, user interface elements, and virtual objects using the electronic eyeglasses. Because the electronic components of the electronic eyeglasses may be embedded within the lens and/or the frame, a pair of electronic eyeglasses as described herein may resemble a pair of conventional eyeglasses in size and form.

Figure 1:
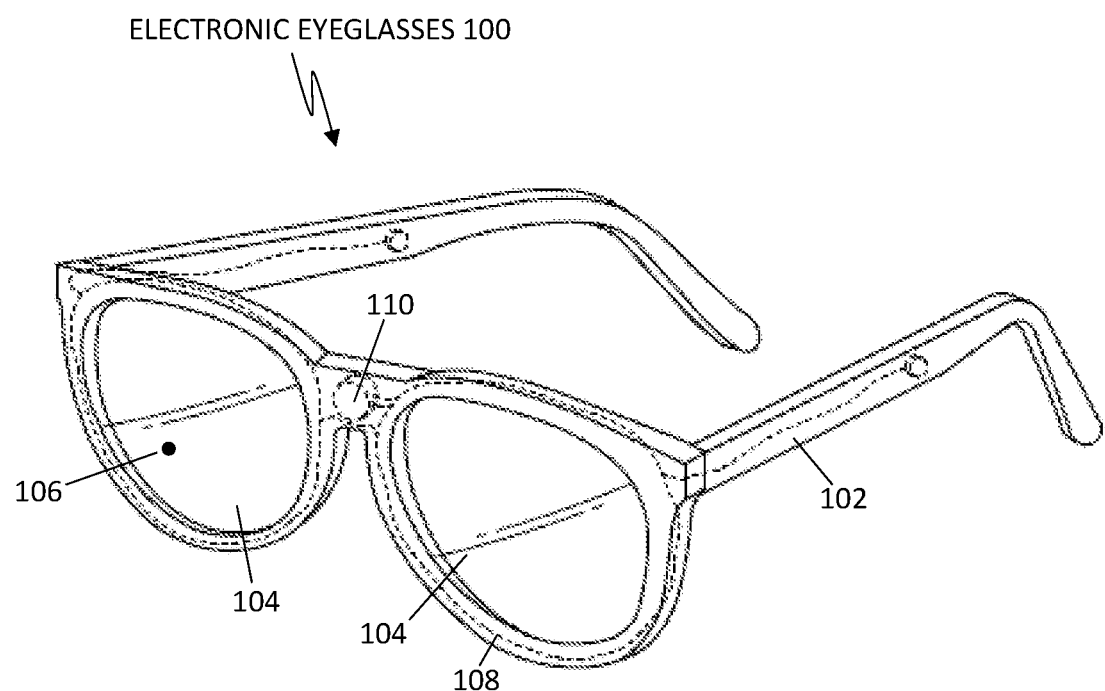
FIG. 1 shows a pair of electronic eyeglasses, in accordance with some embodiments.

FIG. 1 shows a pair of electronic eyeglasses in accordance with some embodiments. As illustrated in FIG. 1, the electronic eyeglasses 100 include a frame 102, and a pair of lenses 104 mounted within the frame 102 (e.g., corresponding to the left and right eyes of a wearer). The electronic eyeglasses 100 further include at least one femtoprojector 106 attached to at least one of the lenses 104. In some embodiments, the femtoprojector 106 is embedded within the lens 104. In other embodiments, the femtoprojector 106 is attached to a surface of the lens 104 or to a portion of the frame 102.

The femtoprojector 106 includes an image source and an optical system. It is positioned at a location on the lens 104 such that, at least for certain orientations of the wearer's eye, the optical system is able to project an image from the image source through the pupil of the eye and onto the retina. In some embodiments, the femtoprojector 106 is configured to project light of a particular wavelength range (e.g., a monochrome image). In some embodiments, the femtoprojector 106 may project light of a plurality of different wavelengths (e.g., wavelengths corresponding to an RGB color space for a color image).

Although FIG. 1 only illustrates a single femtoprojector 106 embedded within one lens 104 of the electronic eyeglasses 100, in other embodiments, a single pair of electronic eyeglasses 100 may contain many femtoprojectors 106 at different locations on the lenses 104. For example, in some embodiments, each of the two lenses 104 may contain one or more femtoprojectors 106 (e.g., embedded within or attached to a surface thereon) at corresponding left and right locations of the lenses 104. In some embodiments, a lens 104 may have many femtoprojectors 106 at different locations on the lens 104. As noted above, in some embodiments, one or more femtoprojectors 106 may also be attached to or embedded within the frame 102 (see also FIG. 3 below).

The electronic eyeglasses 100 further include circuitry such as a power coil 108 and a controller 110 for providing power and control data to the femtoprojector 106. In some embodiments, the additional circuitry is embedded within the material of the frame 102. In other embodiments, the power coil 108 and/or the controller 110 are attached to a surface of the frame 102 or on or within the lenses 104.

The power coil 108 receives power from an external source, and may include one or more coils that convert a magnetic field generated by an external coil (not shown in FIG. 1) into power. For example, a current generated within the power coil 108 via inductive coupling is used to power the femtoprojector 106 and the controller 110. In some embodiments, the power coil 108 includes a coil forming a loop around a lens 104 of the electronic eyeglasses 100, as shown in FIG. 1.

In some embodiments, the frame 102 further contains a capacitor (not shown in FIG. 1). The capacitor is charged by the current generated by the power coil 108 and stores an amount of energy that is sufficient to meet a peak energy consumption of the femtoprojector 106, such that even if the instantaneous power generated by the power coil 108 is not enough to supply the power needs of the femtoprojector 106 and controller 110, the femtoprojector 106 may continue to operate substantially uninterrupted by drawing power previously stored in the capacitor in order to supplement the difference.

In some embodiments, the frame 102 contains a battery (not shown) in addition to or instead of the power coil 108. For example, the current generated by the power coil 108 may be used to charge the battery, which then provides power to the femtoprojector 106 and controller 110. In some embodiments, the electronic eyeglasses 100 may contain other types of components for providing power to the femtoprojector 106 and controller 110, such as one or more solar cells.

The controller 110 controls the operations of the femtoprojector 106. For example, the controller 110 may control what image data is provided to the femtoprojector 106 for display. In some embodiments, the image data is received directly by the femtoprojector 106. In some embodiments, the controller 110 may be internal to the femtoprojector 106 or is coupled directly to the femtoprojector 106.

In some embodiments, the controller 110 is in communication with one or more sensors (not shown) attached to the frame 102 and/or one or more external sensors. For example, the controller 110 may receive data from an ambient light sensor attached to the frame 102, and may adjust the brightness or intensity of the image data to be projected by the femtoprojector 106 based upon the received ambient light data. In some embodiments, the sensors may comprise a camera, an inertial sensor (e.g., an accelerometer or a gyroscope), a magnetometer, a global navigation satellite system (GNSS) or global positioning system (GPS), and/or the like. In some embodiments, the controller 110 extracts data (e.g., image data, control data, and/or external sensor data) encoded within the magnetic field generated by an external generator coil coupled to the power coil 108. In other embodiments, controller 110 is configured to receive data via a separate signal, such as a radio frequency (RF) signal, ultrasonic data transmission signal, Bluetooth signal, and/or the like. In some embodiments, instead of or in addition to the power coil 108, the electronic device of the electronic eyeglasses 100 may receive power or data via an electrical conductor. For example, a wire may extend from one of the temples of the electronic eyeglasses 100 connecting to an external source of power or data.

In some embodiments, an electrical trace (not shown) attached to the lens 104 connects the femtoprojector 106 to the power coil 108 and/or the controller 110, allowing for power and data (e.g., image data) to be transmitted to the femtoprojector 106 over or through the lens 104. In some embodiments, the electrical trace is a conductor embedded within the lens 104. In other embodiments, the electrical trace is attached to a surface of the lens 104 (e.g., using an adhesive). The electrical trace may be substantially optically transparent in order to reduce impact on the wearer's visibility when wearing the electronic eyeglasses 100.

In some embodiments, the electronic eyeglasses 100 may contain additional electronic components (not shown), such as a camera (e.g., an outward facing camera configured to capture images of the local area surrounding the wearer, etc.), one or more sensors (e.g., an ambient light sensor configured to measure an amount of ambient light in the local area), and the like. The controller 110 may receive camera or sensor data and modify the image data to be displayed by the femtoprojector 106 based on received camera or sensor data (e.g., brightening or dimming the image data based upon a sensed amount of ambient light, display text or images corresponding to sensor readings, etc.). In some embodiments, the electronic eyeglasses 100 may transmit camera or sensor data to an external device, such as a mobile device associated with the wearer, via a back channel (e.g., via the magnetic field generated by an external generator coil coupled to the power coil 108, RF signal, Bluetooth, and/or the like).

Figure 2:
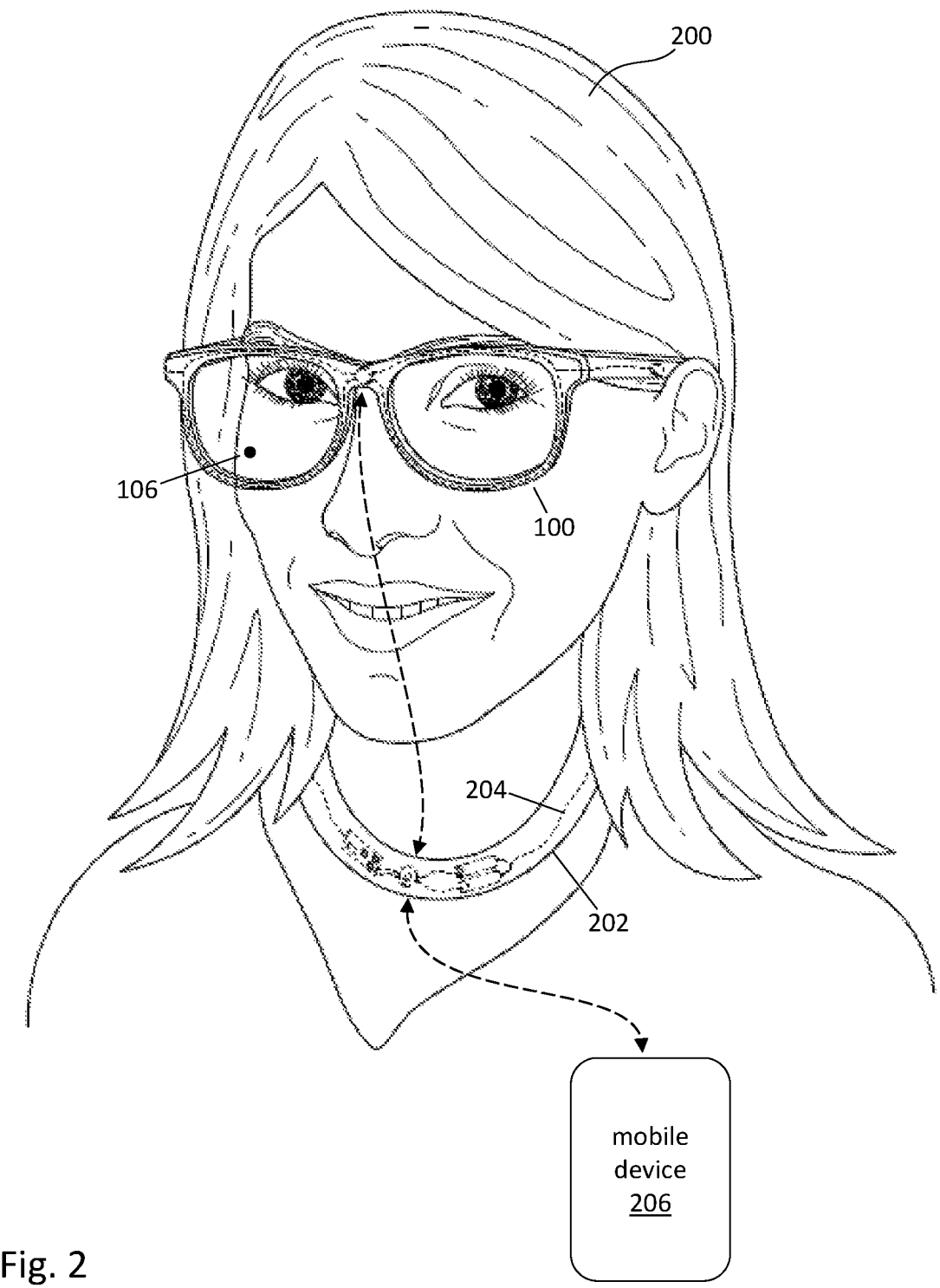
FIG. 2 shows a pair of electronic eyeglasses being worn by a wearer, in accordance with some embodiments.

FIG. 2 shows a pair of electronic eyeglasses being worn by a wearer, in accordance with some embodiments. As illustrated in FIG. 2, the wearer 200 wears the electronic eyeglasses 100 in the same way as how one would wear a pair of conventional (i.e., non-electronic) eyeglasses. As discussed above, the electronic eyeglasses 100 include at least one femtoprojector 106 that projects images onto a retina of the user.

In some embodiments, the wearer 200, in addition to wearing the electronic eyeglasses 100, also wears a necklace 202. As used herein, a "necklace" is a structure wearable by the wearer 200 that, when worn, is supported by the wearer's 200 neck and/or shoulders. In addition, the necklace 202 may include one or more electronic components arranged on or within the structure. In some embodiments, the structure of the necklace 202 includes a flexible material enclosing the one or more electronic components, such as rubber. In other embodiments, instead of a necklace 202, the wearer 200 may wear other types of structures containing electronic components.

In some embodiments, the necklace 202 includes a power transmitter coil 204 that generates a magnetic field. The generated magnetic field can be electromagnetically coupled to the power receiver coil 108 of the electronic eyeglasses 100, allowing for wireless power transfer from the transmitter coil 204 to the receiver coil 108. In some embodiments, the transmitter coil 204 extends throughout the necklace 202 and surrounds the neck of the wearer 200 when the necklace 202 is worn. In some embodiments, the transmitter coil 202 is powered by a battery located within the necklace 202.

The necklace 202 further includes a transmitter/receiver configured to transmit or receive image data, control data, and/or other information to and from the electronic eyeglasses 100 (e.g., to and from the controller 110). In some embodiments, the transmitter/receiver may transmit data using the magnetic field generated by generator coil 204. In other embodiments, the transmitter/receiver transmits and/or receives data to and from the controller 110 via a separate wireless channel (e.g., RF channel, ultrasonic signal, Bluetooth, and/or the like). Further embodiments of the necklace 202 are described in greater detail in U.S. patent application Ser. No. 15/889,174, "Adaptive Tuning of a Contact Lens" and U.S. patent application Ser. No. 15/822,913, "Unobtrusive Eye Mounted Display," both of which are hereby incorporated by reference in their entireties. In other embodiments, the necklace 202 may be connected to the electronic eyeglasses 100 via a wire for transmitting power and/or data.

In some embodiments, a mobile device 206 (for example, a smartphone, laptop, tablet, and/or any other type of electronic device containing a processor) generates image data and/or control data, and transmits the data directly to the electronic eyeglasses 100 to control the operation of the femtoprojector 106. In some embodiments, the mobile device 206 transmits the generated data to the transmitter/receiver of the necklace 202, which then forwards the data to the controller 110 of the electronic eyeglasses 100. In some embodiments, the mobile device 206 transmits data to the necklace 202 using a first channel, while the necklace 202 forwards the data to the electronic eyeglasses 100 using a second, different channel. For example, in some embodiments, the mobile device 206 transmits data to the necklace 202 using a Bluetooth signal, while the necklace 202 transmits the received data to the electronic eyeglasses 100 via a magnetic field generated by the generator coil 204.

In embodiments where the electronic eyeglasses include one or more sensors, the electronic eyeglasses 100 may transmit measured sensor data to the mobile device 206 (e.g., directly or via the necklace 202). The mobile device 206 can process the received sensor data to generate image data and/or control data to be transmitted to the electronic eyeglasses 100 for operating the femtoprojector 106. In some embodiments, the mobile device 206 may be in communication with one or more external sensors (not shown). For example, the wearer may be wearing a heartbeat sensor which transmits current heartbeat information to the mobile device 206. The mobile device 206 generates image data that includes a visualization of the wearer's current heartbeat as measured by the heartbeat sensor, and transmits the image data to the electronic eyeglasses 100 to be displayed to the wearer 200 by the femtoprojector 106. In some embodiments, the mobile device 206 may also be able to access one or more remote servers (e.g., via a wireless internet connection) or may be in communication with other mobile devices, to receive data used in generating image data and/or control data for the electronic eyeglasses 100. It should be noted that although reference is made to the propagation and display of image data, in practice, the femtoprojector 106 can receive, generate, and display any suitable type of content, such as images, videos, and representations of virtual objects, user interface data, text data, and the like.

Although FIG. 2 illustrates the mobile device 206 exchanging data with the electronic eyeglasses 100 via the necklace 202, in other embodiments, the mobile device 206 may communicate directly with the electronic eyeglasses 100.

Figure 3:
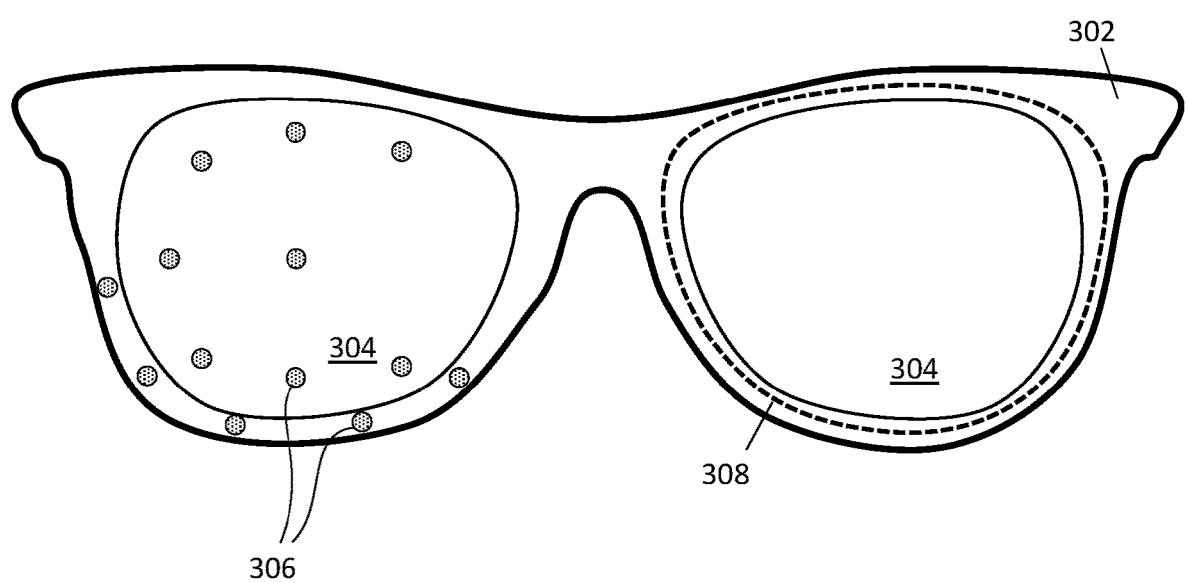
FIG. 3 shows a front view of a pair of electronic eyeglasses showing possible locations for placement of femtoprojectors, in accordance with some embodiments.

Although FIGS. 1 and 2 illustrate only a single femtoprojector 106 on the electronic eyeglasses 100, in some embodiments, the electronic eyeglasses 100 may contain a plurality of femtoprojectors at a plurality of different locations. For example, FIG. 3 shows a front view of a pair of electronic eyeglasses showing some of the possible locations for placement of femtoprojectors, in accordance with some embodiments. The electronic eyeglasses 300 include a frame 302 and lenses 304 mounted within the frame 302. Locations 306 correspond to potential locations for placement of femtoprojectors on the electronic eyeglasses 300. For example, as illustrated in FIG. 3, the locations 306 may correspond to locations on or in the lenses 304, similar to the placement of the femtoprojector 106 illustrated in FIG. 1. In addition, in some embodiments, one or more of the locations 306 may be located on the frame 302.

FIG. 3 further illustrates a power coil 308 attached to the frame 302. In some embodiments, the power coil 308 includes a coil that surrounds a lens 304, forming a loop. As such, the power coil 308 may be able to couple with a magnetic field generated by a nearby transmitter coil (e.g., the transmitter coil 204 of the necklace 202, as illustrated in FIG. 2), in order to wirelessly receive power and/or data.

While FIG. 3 illustrates, for the sake of clarity, locations 306 as being on the left side of the electronic eyeglasses 300 and the power coil 308 be located on the right side of the electronic eyeglasses 300, in some embodiments, the locations 306 for potential placement of femtoprojectors may be on both the sides of the electronic eyeglasses 300 (e.g., on both the left and right lenses 304, or on portions of the frame 302 surrounding the left and right lenses 304). In addition, the power coil 308 may include coils on both the left and right sides of the electronic eyeglasses 300 (e.g., one or more first coils around the left lens, and one or more second coils around the right lens of the electronic eyeglasses 300). In some embodiments, the power coil 308 may extend outside the frame 302. For example, the power coil 308 may extend from and connect the temples of the frame 302, such that it loops around the back of the wearer's head when the electronic eyeglasses 300 are worn by the wearer.

The electronic eyeglasses 300 may include a plurality of femtoprojectors positioned at different locations 306 on the lens 304 and/or the frame 302. Each femtoprojector is designed to project light rays propagating in different directions. The range of propagation directions is referred to as the divergence of the femtoprojector. For a femtoprojector with low divergence (narrow range of propagation directions), if the orientation of the wearer's eye is not facing the femtoprojector, the light projected by the femtoprojector may not pass through the wearer's pupil to reach the retina. In that case, the image from the femtoprojector will not be viewable by the wearer. As such, for a particular femtoprojector, the wearer may be able to view images projected by the femtoprojector only when his eye is in a certain orientation (e.g., gazing towards the femtoprojector). Conversely, if the wearer gazes away from the femtoprojector, he will not see the image from the femtoprojector. If the femtoprojector is positioned off-center in the eyeglasses lens, then the wearer looking straight ahead may be looking away from the femtoprojector. In some embodiments, the divergence of the femtoprojector may be as narrow as 4 degrees or less (as measured along one direction) or as wide as 20 degrees or more.

Figure 4:
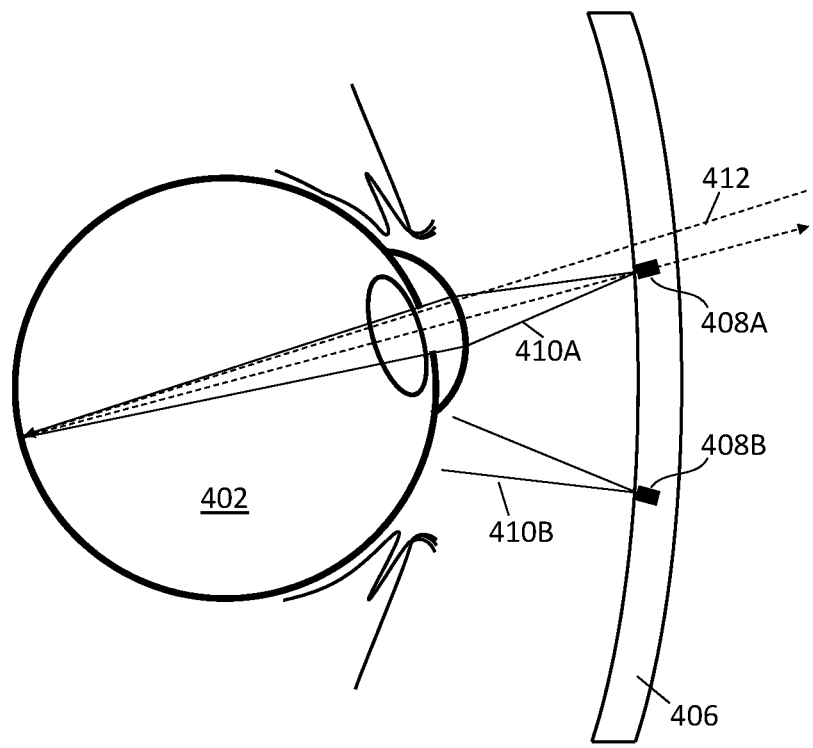
FIG. 4 shows interactions between different femtoprojectors of a pair of electronic eyeglasses and a wearer's eye, in accordance with some embodiments.

FIG. 4 shows interactions between different femtoprojectors of a pair of electronic eyeglasses and a wearer's eye, in accordance with some embodiments. As illustrated in FIG. 4, a pair of femtoprojectors 408A and 408B may be embedded within a lens 406 at different locations and with different orientations. For example, the first femtoprojector 408A is configured to project light rays 410A over a first solid angle towards the eye 402 of a wearer, and the second femtoprojector 408B is configured to project light rays 410B over a second solid angle towards the eye 402.

The solid angles of the projected light rays 410A and 410B may be small angles. For example, they may be somewhere between 4 and 20 degrees (as measured along one direction) for some embodiments). In order for the images projected by the femtoprojectors 408A and 408B to be viewable by the wearer, the light rays 410A or 410B must pass through the pupil of the wearer's eye 402 to reach the wearer's retina. Otherwise, the light rays are blocked and will not reach the wearer's retina, and the wearer will be unable to view the projected image. For example, as illustrated in FIG. 4, the wearer is able to view images projected by the first femtoprojector 408A, because the light rays 410A projected by the first femtoprojector 408A pass through the pupil of the eye 402 to reach the retina. However, the wearer is unable to view the images projected by the second femtoprojector 408B, because the light rays 410B projected by the second femtoprojector 408B are blocked from entering the pupil of the eye 402.

On the other hand, if the orientation of the eye 402 changes such that the light rays 410B are able to pass through the pupil, the wearer will be able to view images projected by the second femtoprojector 408B (but not the first femtoprojector 408A since its light rays 410A will be blocked). In some embodiments, the eye 402 may be oriented such that only a portion of the rays 410A or 410B is able to enter the pupil (the remaining portion being blocked from entering the pupil). In such cases, the wearer may only be able to view a portion of the image projected by the femtoprojector 408A or 408B, depending upon which rays pass through the pupil to reach the retina of the wearer's eye 402.

In addition, outside light 412 originating from the external environment surrounding the wearer may pass through portions of the lens 406 other than those containing the femtoprojectors 408A and 408B to reach the retina of the eye 402 through the pupil. As such, the wearer is able to view images projected by the first femtoprojector 408A as well as objects in the external environment. In some embodiments, the femtoprojectors 408A and 408B may be opaque and block light from the external environment that is incident on the femtoprojectors 408A and 408B. However, the femtoprojectors 408A and 408B are typically small enough in size that the wearer's view of the external environment is not substantially obstructed even when the wearer is gazing in the direction of the femtoprojector. In addition, because the femtoprojectors 408A and 408B are so close to the wearer's eye 402, the wearer is unable to focus on the femtoprojectors 408A and 408B, which makes them even less visible. However, the eye 402 is able to view the images projected by the femtoprojectors 408A and 408B, provided the light from the femtoprojectors is able to pass through the pupil of the eye 402 to reach the retina.

In some embodiments, the locations of the femtoprojectors 408A and 408B on the lens 406 are selected such that, at any particular time, the wearer is able to view images projected by only a portion of the femtoprojectors. In addition, for certain orientations of the eye 402, the wearer may not be able to view the projected images from either femtoprojector 408A or 408B. For example, in some embodiments, it is desirable that the images projected by the femtoprojectors 408A and 408B not be visible to the wearer when his eyes are oriented in certain directions (e.g., gazing straight ahead). However, when the wearer gazes in a certain direction, he may be able to view images from a first femtoprojector 408A, while gazing in another direction allows the wearer to view images from a different femtoprojector. In some embodiments, the first and second images may represent data from different sensors.

By using different femtoprojectors to project light from different locations and directions, the electronic eyeglasses can be configured such that the wearer is able to view the local environment through the electronic eyeglasses without distraction when gazing in certain directions (e.g., straight ahead), while also able to view additional information from the femtoprojectors simply by gazing in different directions, for example outwards (i.e., away from the nose) or upwards or downwards. In other embodiments, the electronic eyeglasses are configured such that the images from a femtoprojector are viewable when the wearer gazes straight ahead. In some cases, the femtoprojector may be positioned and designed so that its images are always viewable regardless of where the viewer is gazing.

In some embodiments, the femtoprojectors 408A and 408B may project images all the time, allowing the wearer to view the images at his convenience. In other embodiments, one or more head tracking sensors may determine an orientation of the wearer's head, and the femtoprojectors 408A and/or 408B project images only when the wearer's head is in certain predetermined orientations (e.g., head tilted up or down). In some embodiments, eye tracking sensors may determine an orientation of the eye 402. Instructions may be transmitted to the femtoprojectors 408A and 408B such that they only project light for certain orientations of the eye 402 (e.g., orientations in which the light rays from the femtoprojectors would pass through the pupil of the eye 402).

Figure 5:
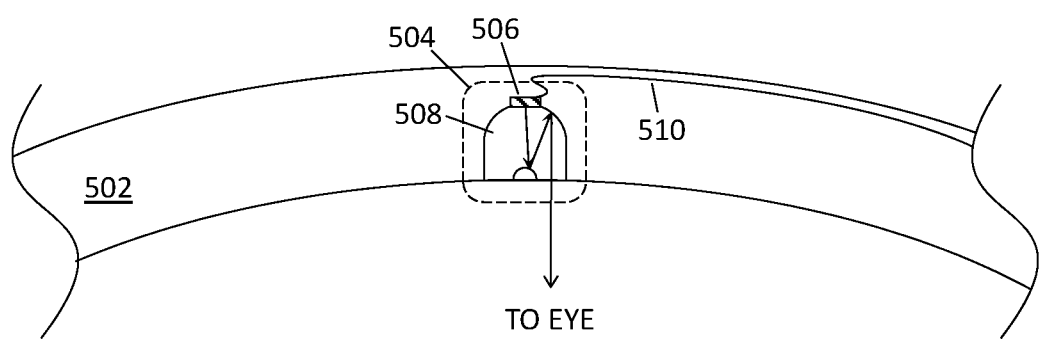
FIG. 5 shows a femtoprojector embedded in a lens, in accordance with some embodiments.

FIG. 5 illustrates a femtoprojector 504 embedded in a lens, in accordance with some embodiments. The lens 502 corresponds to a cross-section of a portion of an eyeglasses lens (e.g., the lens 104 illustrated in FIG. 1). In some embodiments, a cavity is formed on a surface of the lens 502. The femtoprojector 504 is inserted into the cavity and oriented such that the femtoprojector is able to project light towards the wearer's eye when the wearer wears the electronic eyeglasses.

The femtoprojector 504 includes an image source 506 and an optical system 508. The image source 506 receives image data (e.g., via the electrical trace 510) from a controller (e.g., controller 110), and displays an image based upon the received image data. In some embodiments, the image source 506 is an LED array. The optical system 508 projects the image from the image source 506 in a desired direction towards the wearer's eye, forming an image on the wearer's retina.

Although FIG. 5 illustrates the femtoprojector 504 inserted into the lens 502 through a cavity formed on the side of the lens 502 facing the wearer's eye, in other embodiments, the cavity may be formed on a side of the lens 502 facing away from the wearer's eye. As such, the light projected by the femtoprojectors 504 may pass through a portion of the lens 502 in order to reach the eye. In some embodiments, the material of the optical system 508 and the lens 502 may be index matched to reduce reflection at an interface of the optical system 508 and the lens 502.

In some embodiments, after the femtoprojector 504 is inserted into the lens 502, a covering layer (not shown) may be formed over the cavity on the lens 502, such that the femtoprojector 504 is completely encapsulated. In some embodiments, the covering layer may be composed of the same material as the lens 502, or a material that is index matched to that of the lens 502, in order to reduce an amount of reflection at an interface between the lens 502 and the covering layer.

The lens 502 further contains an electrical trace 510 connected to the femtoprojector 504, allowing the femtoprojector 504 to receive power and image data from a controller and/or a power source such as a power coil or battery. In some embodiments, the electrical trace 510 is embedded within the lens 502, printed within or on a surface of the lens, or adhered to a surface of the lens. In other embodiments, the electrical trace 510 is attached to an outer surface of the lens 502 and held in place on the lens 502 using an optically transparent adhesive material.

While FIG. 5 illustrates the femtoprojector 504 in a specific orientation relative to the lens 502 (e.g., the direction of light projection from the femtoprojector being substantially orthogonal to the surface of the lens 502), in some embodiments, the femtoprojector may be oriented differently relative to the lens 502. For example, in some embodiments, the cavity may be formed to be larger than the femtoprojector 504, allowing for the orientation of the femtoprojector 504 to shift within the cavity. Once a desired orientation for the femtoprojector 504 is determined, the cavity is filled with an optically transparent material to hold the femtoprojector in place. This may allow for the orientations of the femtoprojectors on a pair of electronic eyeglasses to be calibrated for a particular wearer. For example, a plurality of femtoprojectors may be initially placed within respective cavities on the lens 502. The electronic eyeglasses are then worn by the wearer, and the orientation of each femtoprojector is adjusted such that it is able to project light in a desired direction towards the wearer's eye.

In some embodiments, the lens 502 may include one or more ball and socket structures formed on a surface thereof or within respective cavities on the lens 502. Each ball and socket structure includes a stationary socket and a ball able to rotate within the socket. The ball is configured to be attachable to a femtoprojector. When a femtoprojector 504 is inserted into the ball and socket structure by being attached to the ball, the location of the femtoprojector 504 relative to the lens 502 becomes fixed, while the orientation of the femtoprojector 504 remains adjustable (e.g., by rotating the ball within the socket). Once a desired orientation for the femtoprojector 505 is determined, the femtoprojector 504 may be held in place (e.g., using an optically transparent material). In some embodiments, the femtoprojector 504, when attached to ball of the ball and socket structure, is electrically connected to the socket. The electrical traces 510 are attached to the socket of each ball and socket structure and electrically connected to the ball, allowing for the electrical traces 510 to be connected to respective femtoprojectors 504 without the orientation of the femtoprojector 504 needing to be set.

The image source 506 may be a display chip such as an array of light-emitting pixels (e.g., a light emitting diode (LED) array). The LED array may be similar to that described in U.S. patent application Ser. No. 15/894,712, "Ultra-Dense LED Projector," hereby incorporated by reference its entirety. It may have a pixel-to-pixel pitch of less than 4 μm, or, in some embodiments, less than 1 μm. The optical system images light from the image source onto the retina. Examples of optical systems are described in U.S. patent application Ser. No. 15/570,707, "Femtoprojector Optical Systems," which is hereby incorporated by reference in its entirety. In some embodiments, the femtoprojector may have a resolution not worse than 2 arc minutes of the wearer's field of view per pixel. The resulting virtual image may appear to span at least 5 degrees of the wearer's field of view. In some embodiments, the femtoprojector may have a magnification of at least 3×, as measured from the image source of the femtoprojector to the wearer's retina.

Figure 6:
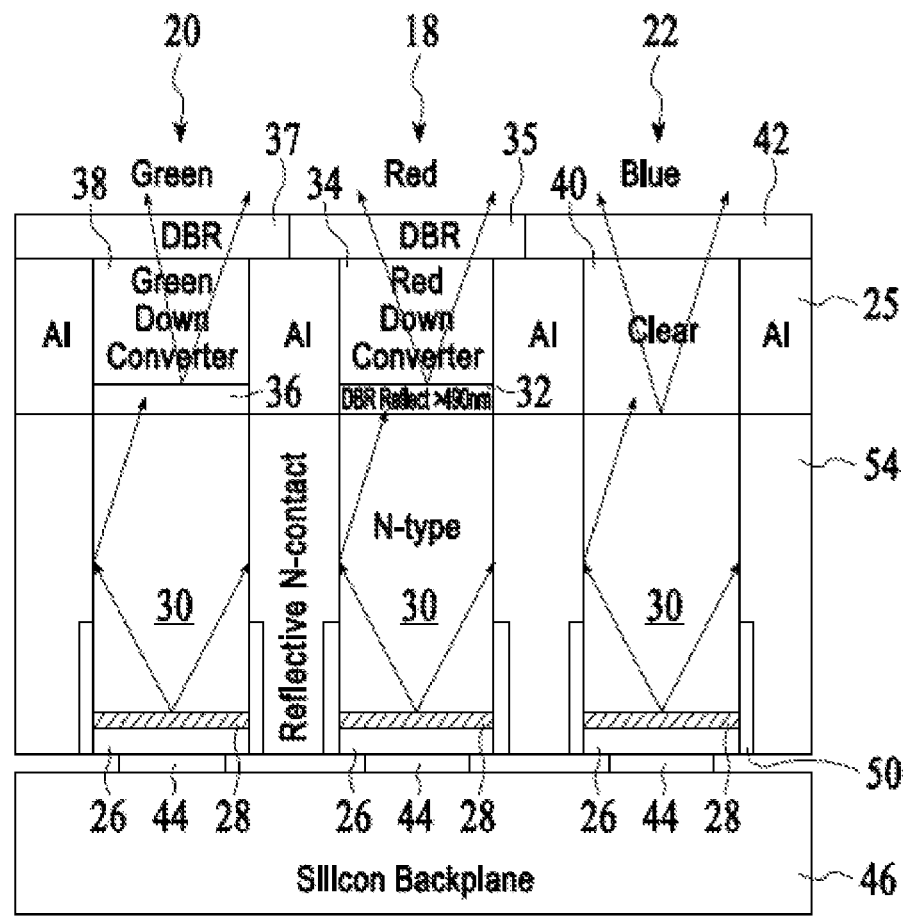
FIG. 6 shows a cross-sectional view of three pixels of a color LED array, in accordance with some embodiments.

FIG. 6 shows a cross-sectional view of three pixels of a color LED array, in accordance with some embodiments. The cross-section is taken through a red pixel 18, a green pixel 20, and a blue pixel 22. As seen, the pixels are much taller than wide. The GaN semiconductor regions 30 are optically isolated from each other and electrically connected to each other by the reflective metal N-contact 54 filling the space between the pixels.

The red pixel 18 includes a thin P-type layer 26, an active layer 28, a relatively thick N-type layer 30, a distributed Bragg reflector (DBR) 32 that passes blue light but reflects red light, and a red down converter 34 such as a phosphor or quantum dots. Overlying the red down converter 34 may be a reflective DBR 35 that reflects blue light but passes red light. The green pixel 20 is the same as the red pixel 18 except that the DBR 36 reflects green light, and a green down converter 38 overlies the blue pump LED. Overlying the green down converter 38 may be a reflective DBR 37 that reflects blue light but passes green light. The blue pixel 22 is the same as the red pixel 18 except that no DBR or wavelength converter is needed. A clear dielectric material 40 and protective layer 42 may be formed over the blue pump LED to maintain planarity with the red and green pixels. If the blue pump light is not the desired blue display wavelength, such as when using deep blue light <430 nm, a suitable DBR and down converter material may be used to generate the desired blue display wavelength, which may be in the range of 455 nm to 470 nm. A protective transparent oxide layer (not shown) may be formed over the top of the display.

Reflective P-metal electrodes 44 (anode electrodes) are formed on the P-type layer 26 and electrically contact associated metal pads on a backplane substrate 46. They also increase optical efficiency by reflecting light towards the desired output face. The substrate 46 may comprise silicon and includes addressing circuitry.

After the LED semiconductor layers are formed, they are masked and etched (e.g., by RIE) to form trenches around each pixel area. These trenches form pillars of the semiconductor layers. The trenches are substantially vertical but may have a slight inward angle due to RIE etching characteristics. A transparent dielectric material 50, such as oxide or nitride, is formed around the bottom portion of each LED sidewall to insulate the sides of the P-type layer 26 and active layer 28 in the region of the PN active junction. This may be done using masking and etching steps. The sidewalls of the N-type layer 30 are exposed.

A reflective N-metal 54 (cathode electrode) is deposited in the trenches between the pixels to electrically contact a large vertical sidewall area of the N-type layer 30. 80% or more of the height of the pillar may be electrically contacted by the N-metal 54. The N-metal 54 may include nickel, silver, gold, aluminum, titanium, alloys thereof, or other reflective metal to achieve at least 80% reflection and may include multiple metal layers. It also provides a low resistance metal-semiconductor contact for the metal in immediate contact and within 100 nm of the N-type layer 30. Further away from N-type layer 30 can be other metal layers chosen for mechanical strength, thermal conductivity and electrical conductivity, such as copper. The side light passing through the dielectric material 50 is also reflected back by the N-metal 54. Accordingly, most of the light generated by each blue pump LED is emitted from the top surface (through the top of the N-type layer 30) and there is little cross-talk between pixels. The N-metal 54 also serves to mechanically support the pillars and distribute heat.

The blue light then passes through the DBR 32/36 to be converted by the red or green down converter material 34/38. The DBRs 32/36 pass blue light but reflect red and green light. Aluminum 25 is deposited over the N-metal 54 in the trenches between the hexagonal pixels to surround the DBRs 32/36, down converter material 34/38, and clear dielectric material 40. The aluminum 25 provides high reflectivity to limit cross-talk. The N-metal 54 is connected to a cathode electrode on the backplane substrate 46. In another embodiment, the aluminum 25 terminates in one or more electrodes along the perimeter of the display for contacting a cathode electrode on the substrate 46.

In an example, the individual RGB pixels are optically fully isolated with no substantial optical path between pixels, thus preventing degradation of the resolution of the display and maintaining a large color gamut.

Figure 7:
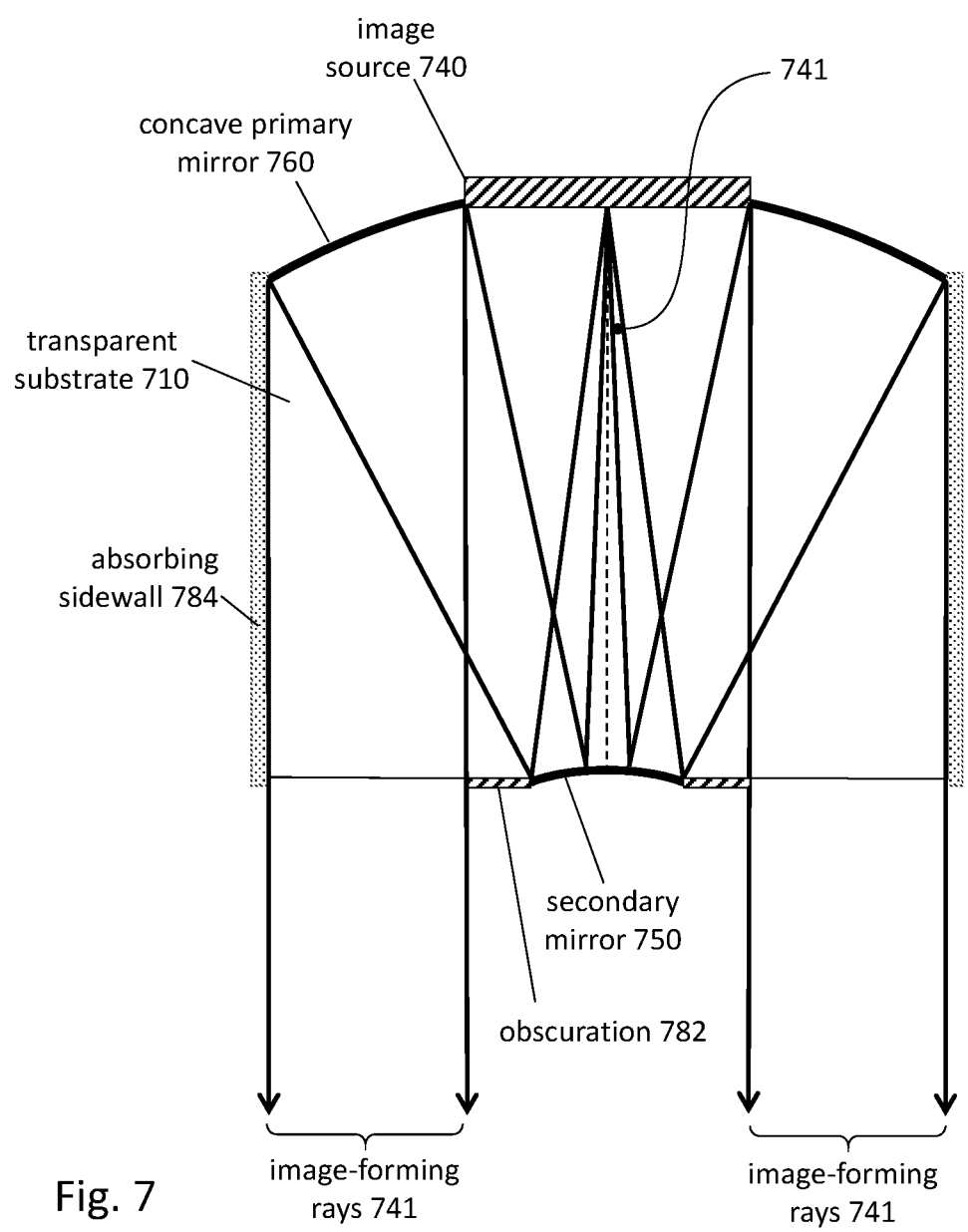
FIG. 7 shows a cross sectional view of a femtoprojector, in accordance with some embodiments.

FIG. 7 shows a cross sectional view of a femtoprojector, in accordance with some embodiments. This example includes a solid, transparent substrate 710. The solid transparent substrate 710 may be made from plastic, glass or other transparent materials.

The optical system of FIG. 7 includes a concave primary mirror 760 and a convex secondary mirror 750. Either or both of these may be aspheric. The concave primary mirror 760 may be formed by coating an end of the substrate 710 with a reflective material such as a metal (e.g. aluminum or silver) or an engineered stack of dielectric layers, and may have a diameter of 1 mm or less. The shape of the primary mirror 760 may be made by any of several different techniques. For example, if the substrate is injection-molded plastic, then the shape of the primary mirror 760 follows the shape of the mold used. Alternatively, the shape of the primary mirror 760 may be made by diamond turning the substrate on a lathe. Or, the shape of the primary mirror 760 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed. The primary mirror 760 includes a mounting area. An image source 740, such as an LED (light emitting diode) display chip of FIG. 6, is mounted at this location.

The secondary mirror 750 faces the image source 740, and the primary mirror 760 faces the secondary mirror 750. Light rays 741 from the image source 740 are first incident on and reflected by the secondary mirror 750 (convex in this example). The reflected rays 741 are then incident on and further reflected by the primary mirror 760 before exiting the optical system. When the optical system is used in a femtoprojector, light from the image source 740 strikes the secondary mirror 750 before the primary mirror 760. Although the secondary mirror 750 in FIG. 7 is drawn smaller than the image source 740, it need not be. The secondary mirror 750 and primary mirror 760 cooperate to project the image from the image source 740 onto the user's retina.

The system may also include a light baffle system to block or at least reduce the stray rays that reach the exit aperture and/or to direct stray rays to areas away from the projected image. In FIG. 7, the baffle system includes an absorbing obscuration 782 and sidewalls 784 (or other types of side baffles).

Figure 8:
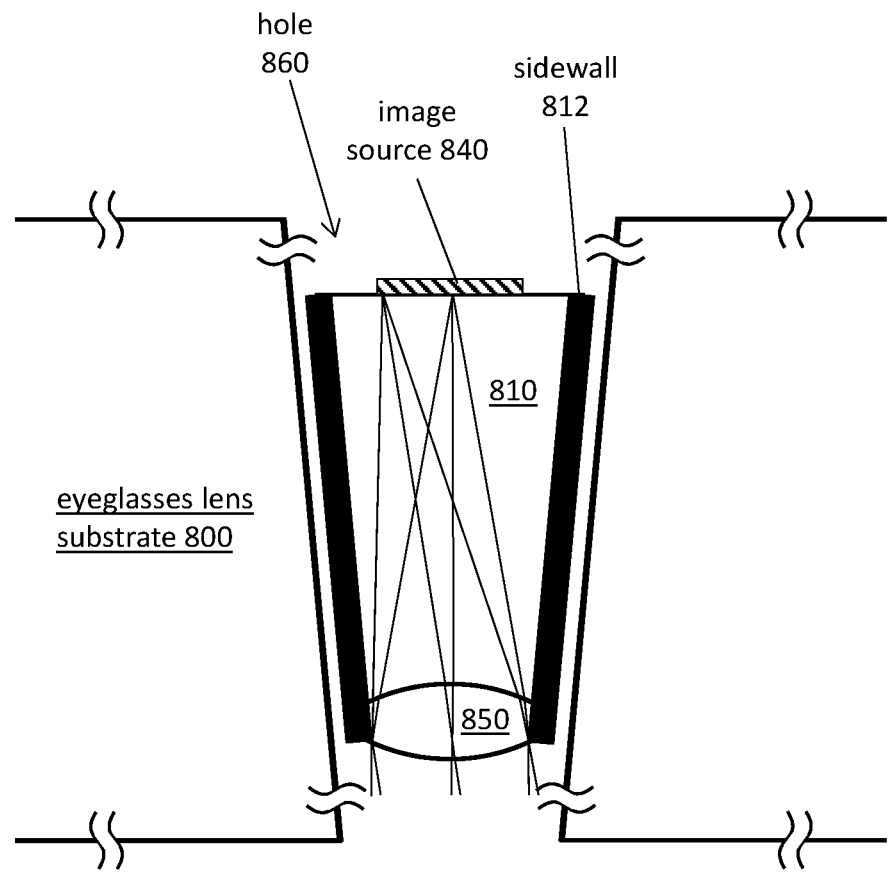
FIG. 8 shows a cross sectional view of another femtoprojector, in accordance with some embodiments.

FIG. 8 shows a cross sectional view of another femtoprojector, in accordance with some embodiments. In FIG. 8, the optical system includes an air core 810, for example the interior of a hollow tube. The air core 810 has the shape of a conical frustum. The sides 812 of the air core are constructed of or are coated with an absorbing material. The large end of the frustum contains the image source 840. The opposite end contains a lens element 850, which in this example is a biconvex lens.

The sidewall structure 812 reduces stray rays from the image source. Most rays incident on the sidewall structure 812 are absorbed. If the sidewall 812 is not perfectly absorbing, some rays may be reflected or scattered. Due to the geometry, reflected rays typically are reflected away from the exit aperture (lens element 850).

In FIG. 8, a tapered hole 860 is formed in the eyeglasses lens material 800. The femtoprojector is inserted into the tapered hole 860. The hole 860 may include alignment aids to aid in positioning the femtoprojector. Although the drawing of FIG. 8 includes a gap between the femtoprojector and the sides of the hole so that the reader can distinguish the two, in some embodiments at least a portion of the femtoprojector contacts the sides of the hole.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. Electronic eyeglasses comprising:
an eyeglasses lens mounted within an eyeglasses frame;
at least one femtoprojector embedded within the eyeglasses lens, the femtoprojector comprising an image source and an optical system, the optical system configured to project an image from the image source through a pupil of the wearer's eye and onto the wearer's retina when the wearer's gaze is oriented towards the femtoprojector.

2. The electronic eyeglasses of claim 1, where the femtoprojector occupies a volume of not more than 2 mm×2 mm×2 mm.

3. The electronic eyeglasses of claim 1, where the image from the image source is not viewable by the wearer when the wearer gazes straight ahead.

4. The electronic eyeglasses of claim 1, where the image from the image source is viewable by the wearer when the wearer gazes towards a temporal direction.

5. The electronic eyeglasses of claim 1, where the image from the image source is viewable by the wearer when the wearer gazes straight ahead.

6. The electronic eyeglasses of claim 1, where the at least one femtoprojector comprises:
a plurality of femtoprojectors embedded within the eyeglasses lens at different locations, each femtoprojector comprising an image source and an optical system, each optical system configured to project an image from the corresponding image source through a pupil of the wearer's eye and onto the wearer's retina when the wearer's eye is oriented towards that femtoprojector.

7. The electronic eyeglasses of claim 6 where, for any given orientation of the wearer's eye, not all of the images from all of the femtoprojectors are viewable by the wearer.

8. The electronic eyeglasses of claim 6 where, for any given orientation of the wearer's eye, only the image from not more than one femtoprojector is viewable by the wearer.

9. The electronic eyeglasses of claim 1, where the image projected by the femtoprojector spans at least 5° of the wearer's field of view.

10. The electronic eyeglasses of claim 1, where the femtoprojector has a resolution of not worse than 2 arc minutes of the wearer's field of view per pixel.

11. The electronic eyeglasses of claim 1, where the femtoprojector has a magnification of at least 3×.

12. The electronic eyeglasses of claim 1, where the optical system comprises:
   a convex secondary mirror facing the image source, where image-forming rays from the image source are incident on and reflected by the secondary mirror;
   a concave primary mirror facing the secondary mirror and further reflecting the image-forming rays from the secondary mirror, the secondary mirror and primary mirror cooperating to project the image from the image source; and
   a light baffle system that blocks stray rays from the image source that are not reflected by the secondary mirror.

13. The electronic eyeglasses of claim 1, where the optical system comprises:
   an optically transparent core bounded by a first end and a second end opposite the first end, where the first end is at least as large as the second end;
   a sidewall structure that extends between the two ends; and
   a lens element positioned at the second end.

14. The electronic eyeglasses of claim 1, where the image source is an array of LEDs with a pixel-to-pixel pitch of not more than 4 microns.

15. The electronic eyeglasses of claim 1, further comprising a transparent conductor for transmitting power and/or data to the femtoprojector.

16. The electronic eyeglasses of claim 1, further comprising a power receiver coil that extends from the temples of the frame and loops around a back of the wearer's head, the power receiver coil configured to receive power wirelessly from a power transmitter coil that is external to the electronic eyeglasses.

17. The electronic eyeglasses of claim 1, further comprising a capacitor attached to the eyeglasses frame, the capacitor configured to store an amount of energy sufficient for the femtoprojector to operate at a predetermined peak power level for at least a predetermined period of time.

18. The electronic eyeglasses of claim 1, where the femtoprojector wirelessly receives image data.

19. The electronic eyeglasses of claim 1, further comprising an ambient light sensor attached to the eyeglasses frame, where a brightness of the image from the image source is adjusted according to the ambient light sensor.

20. The electronic eyeglasses of claim 1, further comprising an outward-facing camera attached to the eyeglasses frame.

* * * * *